United States Patent
Nogueira et al.

(10) Patent No.: US 7,509,980 B2
(45) Date of Patent: Mar. 31, 2009

(54) VENTILATION TUBING IN PARTICULAR FOR AN AIRCONDITIONING SYSTEM

(75) Inventors: Manuel Nogueira, La Ferte Saint Aubin (FR); Patrick Dupont, Saint de Braye (FR); Etienne Bruet, Fleury les Aubrais (FR)

(73) Assignee: ESPA, Fleury les Aubray (FR)

( * ) Notice: Subject to any disclaimer, the term of this patent is extended or adjusted under 35 U.S.C. 154(b) by 906 days.

(21) Appl. No.: 10/697,566

(22) Filed: Oct. 31, 2003

(65) Prior Publication Data

US 2004/0214519 A1    Oct. 28, 2004

(30) Foreign Application Priority Data

Nov. 4, 2002   (FR) .................................. 02 13892

(51) Int. Cl.
*F16L 9/14* (2006.01)

(52) U.S. Cl. ................. 138/149; 138/137; 138/140; 428/36.4

(58) Field of Classification Search ............. 138/149, 138/137, 140, 141; 428/36.4
See application file for complete search history.

(56) References Cited

U.S. PATENT DOCUMENTS

| 3,823,255 | A | * | 7/1974 | La Gase et al. | .......... 174/113 R |
| 4,802,921 | A | * | 2/1989 | Motoki | .................. 106/18.12 |
| 5,098,504 | A | * | 3/1992 | Motoki | ..................... 156/305 |

FOREIGN PATENT DOCUMENTS

| JP | 05164472 | 6/1993 |
| JP | 06221662 | 8/1994 |
| JP | 07091593 | 4/1995 |
| JP | 08014488 | 1/1996 |
| JP | 09229465 | 9/1997 |

* cited by examiner

*Primary Examiner*—Patrick F Brinson
(74) *Attorney, Agent, or Firm*—Clark & Brody

(57) ABSTRACT

The present invention relates to ventilation tubing comprising, from the inside to the outside, a bush (1), an insulating layer (2) and a cover sheet (3). Said ventilation tubing is characterized in that the insulating layer is a quartz fiber wool of which the specific surface weight illustratively is between 65 and 140 g/m². The bush (1) and/or the cover sheet (3) may be a plastic sheet exhibiting a weave of interlacing filaments.

In particular the present invention applies to aircraft ventilation circuit tubings.

13 Claims, 1 Drawing Sheet

VENTILATION TUBING IN PARTICULAR FOR AN AIRCONDITIONING SYSTEM

FIELD OF INVENTION

The objective of the present invention is ventilation tubing in particular for an airconditioning system such as in an aircraft.

BACKGROUND OF THE INVENTION

Ventilation tubings for aircraft airconditioning already are known which comprise a silicone fabric bush, a polyimide foam insulating layer and a cover sheet of chlorosulfonated polyethylene elastomer, or tubings that comprise a silicone fabric bush, a glass fiber insulating layer and a polyvinyl fluoride cover sheet. Again ventilation tubings are known which comprise a bush made of a resin composite, a polyimide foam insulation and a chlorosulfonated polyethylene cover sheet.

The above products entail the drawback of high weight, for instance being 1,200 g for a 2 m long tubing which is 205 mm in diameter, that is, more than 7 kg for a standard length of 12 m built up from six end-to-end tubings.

Moreover, as regards the above tubings, the two of them which are fitted with polyimide foam insulation clad with chlorosulfonated polyethylene elastomer do not meet the requirements of the ABD0007 standard regarding resistance to fluids.

On the other hand, the present standard, namely ABD0031, which applies to fire resistance in aeronautics, shall be complemented by a more stringent standard whereby the fire resistance test shall be run using a radiating panel.

Besides the drawback of their weight, the above cited tubings preclude this expansion of the standards.

BRIEF SUMMARY OF THE INVENTION

Accordingly it is the objective of the present invention to create ventilation tubings which shall be lighter than the known products.

Another objective of the present invention is ventilation tubing meeting the above cited fire resistance standard in particular as regards its more stringent version (radiating panel).

Still another objective of the present invention is ventilation tubing exhibiting good resistance to fluids and in particular meeting the ABD0007 standard.

Another objective of the present invention is ventilation tubing of low toxicity in particular in the event of fire and more specifically meeting the conditions of the ABD0031 standard, namely smoke generation.

Another objective of the present invention is ventilation tubing exhibiting good pressure behavior as regards applications involving ventilation conduits.

Another objective of the present invention is ventilation tubing offering good thermal and/or acoustic insulation.

Another objective of the present invention is ventilation tubing which may be bent without other significant deformation.

At least one of the above goals of the invention is attained by ventilation tubing comprising a bush, an insulating layer and at least one cover sheet and characterized in that the insulating layer is a wool of quartz fibers. Said insulating layer may be between 6 and 15 mm thick. Illustratively its specific surface weight may be between 65 and 150 g/m$^2$ and in particular between 80 and 100 g/m$^2$. Its density illustratively may be between 10 and 20 kg/m$^3$.

The said bush and/or cover sheet may be in the form of a plastic sheet, in particular a sheet of polyvinyl fluoride such as TEDLAR, a DuPont trademark, comprising a weave of interlaced filaments, in particular a grid of polyamide-based filaments.

The specific surface weight of the above plastic sheet may be substantially between 30 and 65 g/m$^2$ and its thickness may be substantially between 10 and 15μ (microns).

A plastic winding illustratively made of polyamide 4.6 or else being a thermoplastic material such as polyether ether ketone (in particular PEEK made by Victrex Co.) may be helically wound around the bush and bonded to it using a flame resistant adhesive.

Said winding may be in the form of a filament having a diameter between 1 and 2 mm.

This winding also may be in the form preferably an I-bar and in general in the form of a structure having a defined geometric cross-section.

Other features and advantages of the present invention are elucidated in the illustrative and non-limiting description below and in relation to the appended drawings.

DETAILED DESCRIPTION OF THE INVENTION

Figure 1A:
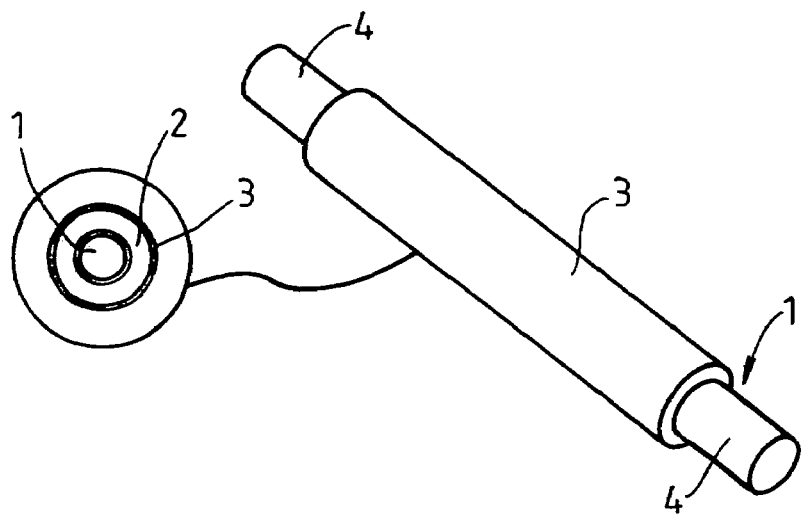
FIGS. 1a, 1b are perspectives of a ventilation tubing.
Figure 1B:
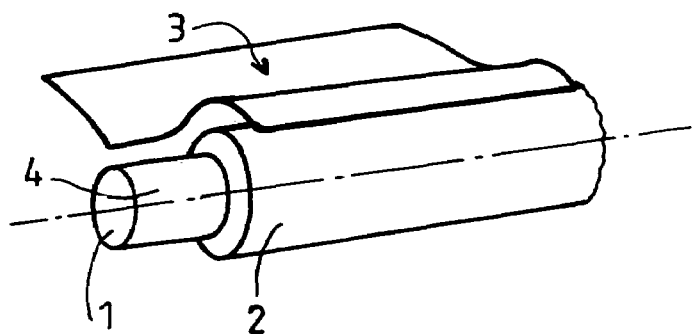

FIG. 1 shows that the insulating tubing comprises a tubular bush 1 to transmit the air of an airconditioning system. Said bush is enclosed by an insulating sleeve 2 and by a cover sheet 3. At each of its ends, the bush 1 projects beyond the sleeve 2 and beyond the coating 3 in order to constitute collars 4 allowing affixing the insulating tubing onto studs in particular for the purpose of lining end to end for instance several tubings 2 m long each in order to constitute extended conduits (for instance one 12 m conduit when configuring six conduits end to end).

Figure 1C:
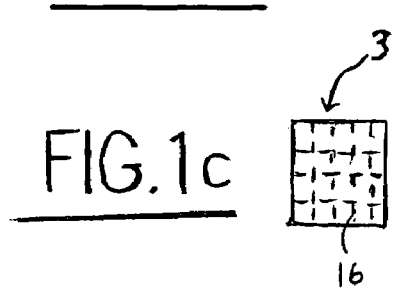
FIG. 1c shows a cover sheet with a weave of interlaced filaments.

The bush 1 consists of a polyvinyl fluoride sheet which is reinforced by a weave of interlaced filaments to attain good mechanical strength. In such case, the specific surface weight of the said layer is about 30 to 65 g/m$^2$, the thickness being between 10 and 15μ. FIG. 1c shows the weave of interlaced filaments 16 when part of the cover sheet 3.

Figure 2A:
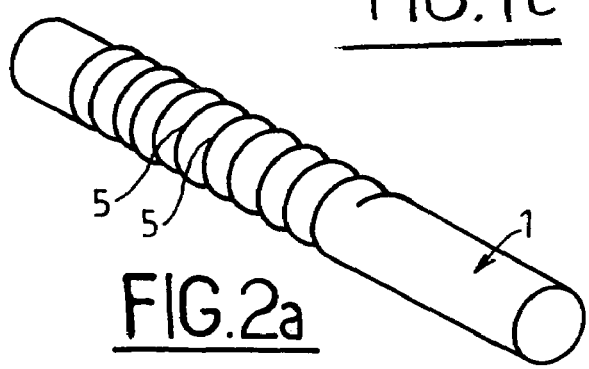
FIG. 2a shows design of the bush.

A structure 5 behaving like a flexible winding and consisting of a filament 6 or being a fire-resistant plastic 7 exhibiting a specific cross-sectional geometry is wound as a helix (FIG. 2a) around said bush. The winding may exhibit a regular pitch for instance between 0.5 and 25 mm.

The filament or the plastic structure 7 is bonded onto the said bush by two beads 10 of a flame-resistant adhesive which also preferably shall be fluid-fast (above ABD0007 standard).

Following assembly, the system remains flexible. Accordingly the winding 5 imparts pressure strength, vacuum strength and rigidity to said tubing and furthermore dimensional stability as regards the radius of curvature whereby the said tubing may be bent into a desired angle without significantly degrading its tubular shape.

Figure 2B:
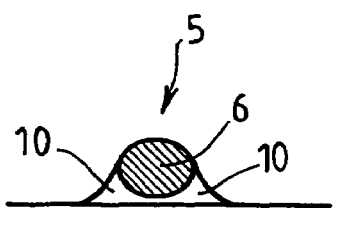
FIG. 2b and FIG. 2c shows two embodiment modes of the plastic filament constituting the winding.

The diameter of the cylindrical wire 6 (FIG. 2b) may be 1 to 2 mm.

Figure 2C:
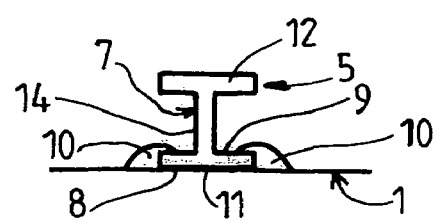

In the embodiment mode of FIG. 2c, the winding 5 is an elongated structure 7 of specified cross-sectional geometry such as an I-bar and is bonded by two adhesive beads 10 to a plane surface 8 to make contact with the outside of the bush 1. This design precludes the winding from rolling when the conduit is made to curve to subtend an angle. The adhesive shall advantageously cover an upper side 9 opposite the plane surface 8.

Preferably said shaped structure shall be an I-bar to exhibit improved rigidity as if it were a beam, that is said shaped structure comprises a substantially straight central segment 14 and two end segments 11 and 12 which are orthogonal to the segment 14, the segment 11 resting by its surface 8 on the outside of the bush 1.

The winding 5 (whether it be a wire 6 or a shaped structure 7) may be made of polyamide (in particular polyamide 4.6) including or not glass fibers, in particular 30 to 45% glass fibers. Said shaped structure also may be a thermoplastic such as polyether ether ketone (commercially known for instance as PEEK made by Victrex plc) containing or not carbon fibers.

As regards a thin bush (10 to 15μ), the winding 5 entails a slightly embossed inner bush surface whereby airflow noise in the tubing is reduced.

The quartz fiber layer 2 allows insulating the outside against heat and sound. The specific surface weight of this product is between 60 and 140 g/m$^2$ and illustratively between 80 and 100 g/m$^2$ when the thickness is between 6 and 15 mm and in particular between 8 and 11 mm.

Advantageously its density is between 10 and 20 kg/m$^3$.

The cover sheet 3 (shown in FIG. 1b before being folded back edge on edge) consists of a polyvinyl fluoride comprising a weave of interlacing threads (illustratively DuPont's TEDLAR). In this case the specific surface weight of the reinforced layer is about 30 to 65 g/m$^2$ at a thickness of 10 to 15μ.

EXAMPLE

| | |
|---|---|
| Bush 1: | TEDLAR layer 12.5 (60 g/m$^2$). |
| Thread 6: | polyamide 4.6 thread of 1.2 mm diameter |
| Insulating layer 2: | quartz fiber felt sheet 12 mm thick (density: 10 to 20 kg/m$^3$) |
| Cover sheet 3: | TEDLAR 12.5 μ thick (30 g/m$^2$). |

The weight of a tubing 1 m long and 76 mm in diameter is about 140 g (i.e., 1.7 kg for a 12 m long assembly) whereas the conventional tubings weigh 3,600 g. The tubing of the above Example in its reinforced version meets the conditions of standards ABD 0007, ABD 0031).

The invention claimed is:

1. Ventilation tubing comprising, as seen from the inside to the outside, a bush, an insulating layer and a cover sheet characterized in that the insulating layer is a quartz-fiber wool, the thickness of said quartz fiber wool is between 6 and 15 mm and said quartz-fiber wool exhibiting a specific surface weight between 65 and 150 g/m$^2$, wherein the bush (1) and the cover sheet (3) is a plastic sheet having a weave of interlaced filaments and wherein the specific surface weight of said plastic sheet is substantially between 30 and 65 g/m$^2$ and its thickness is substantially between 10 and 15μ (microns).

2. Ventilation tubing as claimed in claim 1, characterized in that the density of said quartz fiber wool is between 10 and 20 kg/m$^3$.

3. Ventilation tubing as claimed in claim 1, characterized in that it comprises a plastic winding (5, 6, 7) helically enclosing the bush and bonded to it by a flame-resistant adhesive.

4. Ventilation tubing as claimed in claim 1, wherein a plastic winding (5, 6, 7) helically encloses the bush and is bonded to the bush by a flame-resistant adhesive, and the winding is a filament (6) of which the diameter is between 1 and 2 mm.

5. Ventilation tubing as claimed in claim 3, characterized in that the winding (7) exhibits a specific cross-sectional geometry of which a substantially planar base (8, 11) makes contact with the bush.

6. Ventilation tubing as claimed in claim 5, characterized in that said winding is an I-bar.

7. Ventilation tubing as claimed in claim 1, characterized in that said quartz fiber wool exhibits a specific surface weight between 80 and 100 g/m$^2$.

8. Ventilation tubing as claimed in claim 1, characterized in that the thickness of said quartz fiber wool is between 8 and 11 mm.

9. Ventilation tubing as claimed in claim 1, wherein the plastic sheet is a sheet of polyvinyl fluoride.

10. Ventilation tubing as claimed in claim 1, wherein the weave of interlaced filaments is a grid of polyamide filaments.

11. Ventilation tubing as claimed in claim 9, wherein the weave of interlaced filaments is a grid of polyamide filaments.

12. Ventilation tubing comprising, as seen from the inside to the outside, a bush, an insulating layer and a cover sheet characterized in that the insulating layer is a quartz-fiber wool, wherein the bush (1) and the cover sheet (3) is a plastic sheet having a weave of interlaced filaments, characterized in that it comprises a plastic winding (5, 6, 7) helically enclosing the bush and bonded to it by a flame-resistant adhesive, and the winding (7) exhibits a specific cross-sectional geometry of which a substantially planar base (8, 11) makes contact with the bush.

13. Ventilation tubing as claimed in claim 12, characterized in that said winding is an I-bar.

* * * * *